Aug. 29, 1944.   L. CLEOFE   2,357,084
PADDLE WHEEL STRUCTURE
Filed Oct. 24, 1940   2 Sheets-Sheet 1

Inventor
Lawrence Cleofe
By Clarence A. O'Brien
Attorney

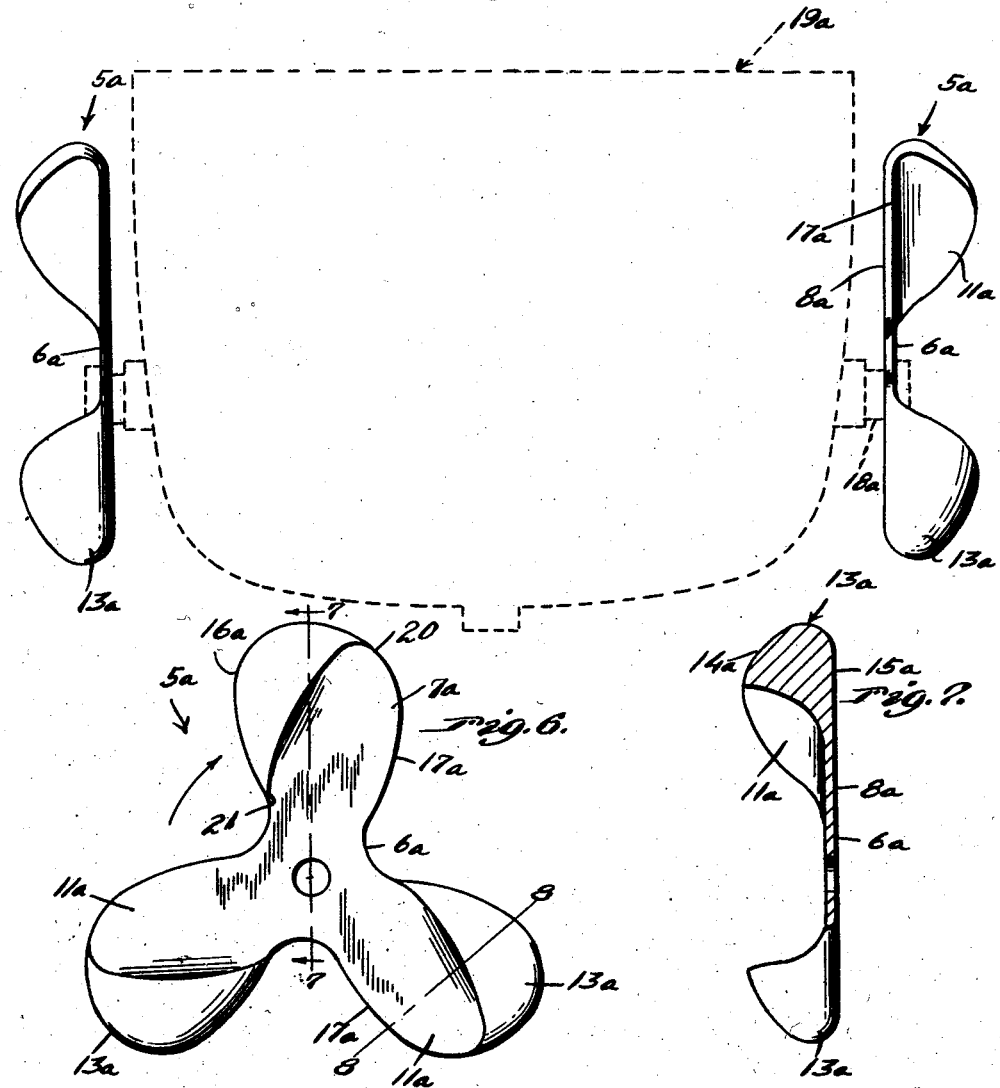

Patented Aug. 29, 1944

2,357,084

UNITED STATES PATENT OFFICE 2,357,084

PADDLE WHEEL STRUCTURE

Lawrence Cleofe, New York, N. Y.

Application October 24, 1940, Serial No. 362,674

1 Claim. (Cl. 171—141)

My invention relates to improvements in paddle wheel structures for the propulsion of watercraft, although not necessarily limited to this use, and the primary object of the invention is to provide structure of this kind wherein the blades or foils are weighted or counter-weighted to have flywheel effect and are so formed as to have a minimum drag when in operation.

Other important objects and advantages of my invention will be apparent from a reading of the following description taken in connection with the appended drawings, wherein for purposes of illustration I have shown preferred embodiments of my invention.

In the drawings:

Figure 5 is a view similar to Figure 1 of another embodiment of the invention in which left and right screw paddle wheels are provided.

Figure 6 is an outboard side elevational view of one of the paddle wheels.

Figure 7 is a transverse vertical sectional view taken through Figure 6 along the line 7—7 and looking toward the left in the direction of the arrows.

Figure 8 is a transverse vertical sectional view taken through Figure 6 along the line 8—8.

Figure 9 is a view similar to Figure 8 taken through a corresponding side of the companion paddle wheel.

Referring in detail to the drawings, and first to the embodiment shown in Figures 1 through 4, the numeral 5 generally designates the paddle wheel which comprises a substantially annular plate-like hub 6 from which radiate at equally circumferentially spaced intervals the foils or blades 7, the blades being similar in size and contour and shape.

Figure 1:
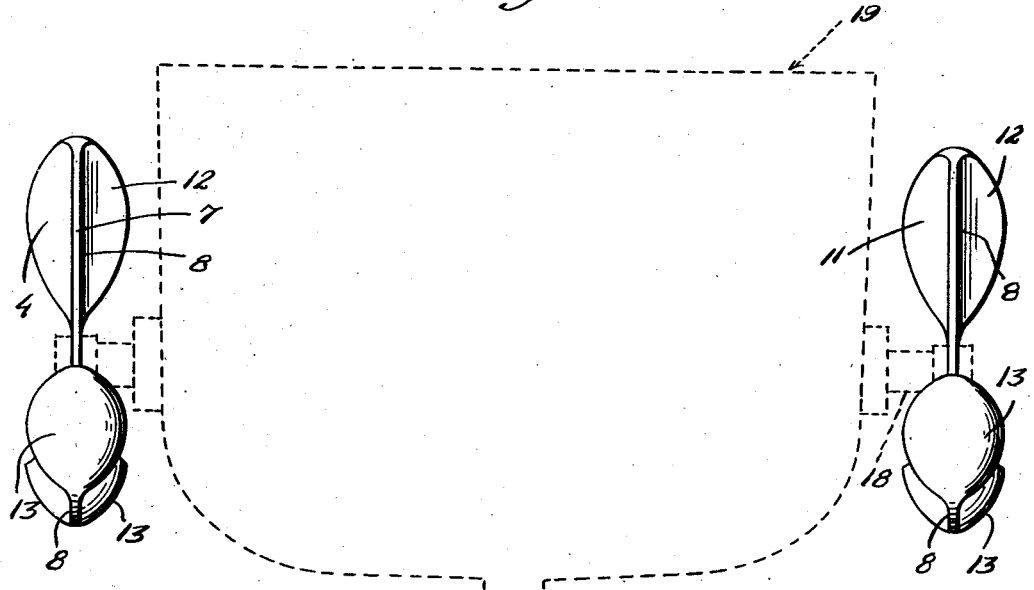
Figure 1 is an edge elevational view of companion paddle wheels showing the relation thereof to the opposite sides of a watercraft, the latter being shown in phantom lines.
Figure 2:
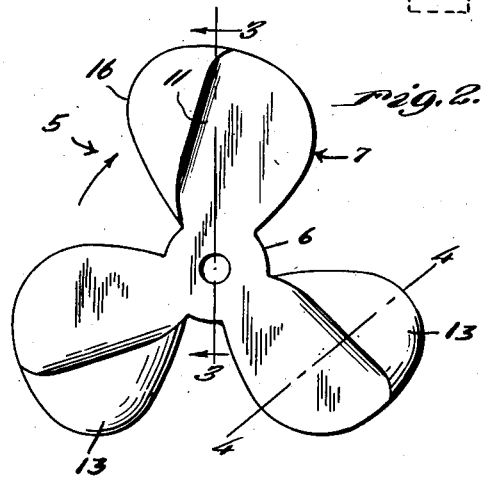
Figure 2 is a side elevational view of one of the paddle wheels.
Figure 3:
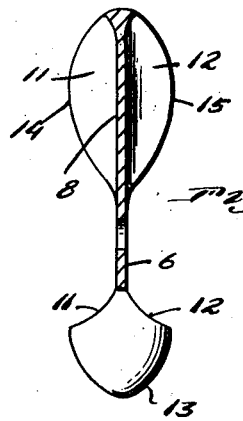
Figure 3 is a transverse vertical sectional view taken through Figure 2 along the line 3—3 and looking toward the left in the direction of the arrows.
Figure 4:
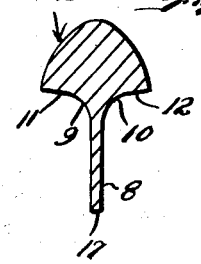
Figure 4 is a transverse vertical sectional view taken through Figure 2 along the line 4—4.

The plan shape of the blades 7 is substantially that of an ordinary water propeller blade comprising a relatively thin plate-like part 8 which in the case of each of the blades lies in the same general plane passing through the hub 6 and having substantially no lateral angulation. The trailing portion of the blade part 8 has its opposite sides merging curvedly and uniformly as indicated by the numerals 9 and 10 with the substantially angular faces 11 and 12 of the bulbous trailing portion 13 which has gently curved sides as indicated by the numerals 14 and 15, respectively, in Figure 3 and a parabolically curved trailing surface 16 as indicated in Figure 2, and a substantially semi-circular mid-section as indicated in Figure 4.

The bulbous portion 13 may be of the same material and integral with the blade portion 8 or of a different material and separate from the blade 8 and attached thereto, but the bulbous portion 13 is in any event of considerable relative weight. In addition the form and arrangement of the portion 13 acts in a well-known manner to reduce the vacuum or suction usually produced behind the blade of a propeller or paddle wheel as the blade or paddle is moved forwardly through the water or other fluid element. The weight and mass of the portion 13 are balanced with respect to each other on the various blades of the propeller or paddle wheel, so that a balanced flywheel action takes place which reduces vibration, and requires a smaller driving force to maintain efficient operation of the paddle wheels. It will be observed that the leading edge 17, with its substantially parabolic curvature, knifes through the water or other fluid when the paddle wheel is rotated in the direction of the arrow appearing in Figure 2, so that the fluid is forced along the opposite sides of the portion 8 and against the surfaces 9, 11 and 10, 12 of the portion 13, the latter acting as paddles to effectively displace the fluid. The propellers or paddle wheels 5 are adapted to be mounted on suitable shafts 18 projecting from opposite sides of the boat or other watercraft 19 as shown.

Referring now to the embodiment of my invention shown in Figures 5 through 9 inclusive, the paddle wheels 5a on the opposite sides of the boat or other watercraft 19a, are screws which are reversed with respect to each other in accordance with the side of the boat on which they are operatively mounted. Each such paddle wheel consists of a plate-like hub portion 6a of irregular shape and formed with a hole to accept a corresponding shaft 18a, with the blades or paddles 7a radiating from the hub 6a at equally circumferentially spaced intervals.

As indicated in Figures 5 and 7 the plate-like portions 8a of the said blades or paddles lie substantially in the same plane as the hub 6a, from the leading edge 17a as far as the point 20 and on the trailing edge only as far as the point 21. Between the points 20 and 21, a corresponding side of the plate-like portion 8a projects outboardly in a radially outward and laterally outward direction to provide the cupped surface 11a, the said surface being the working face of the bulbous weighted portion 13a which lies entirely at one side of the hub 6a and has the truncated teardrop cross-section illustrated in Figures 7, 8 and 9, with its substantially parabolic trailing surface 16a, the gently curved side 14a and the substantially straight opposite side 15a. Each of the described blades 7a is similar in construction and arrangement. It will be observed that as the paddle wheel 5a is rotated in the direction of the arrow in Figure 6, that is clockwise, the leading edge 17a will knife through the water or other fluid and pass the fluid along the outer side of the paddles or blades and against the effective surfaces 11a and thereby effectively displace the fluid and urge the craft forwardly through the water. Like the first described embodiment, the weighted portions 13a produce a smooth-running flywheel action allowing a reduction in driving power, and the shape of the portions 13a reduce the drag or suction otherwise present due to the operation of the blades or paddles in the fluid.

While I have shown and described herein preferred embodiments of my invention, it is to be definitely understood that I do not wish to limit the application of the invention thereto except as required by the subjoined claim.

Having described the invention what is claimed as new is:

A paddle wheel of substantially clover-leaf formation and having co-planer radially extending blades provided with flat surfaces for the greater portion of their areas and at one side edge to form the leading edge of the blades, and a bulbous portion on one surface of each of the blades at their outer ends, and extending substantially throughout the other side edge of the blade to form a longitudinally off-balanced trailing edge, the rear edge of the bulbous portion being rounded and the front edge thereof being longitudinally curved in an arc eccentric to the axis of the wheel and also curved transversely to gradually merge with the flat surface of the blade and constituting the working face of the blade.

LAWRENCE CLEOFE.